3,804,795
HIGH MOLECULAR WEIGHT RESINS HAVING LOW SOLUTION VISCOSITIES

William O. Perry, Marius W. Sorenson, and Thomas J. Hairston, Lake Jackson, Tex., assignors to The Dow Chemical Company, Midland, Mich.
No Drawing. Filed Nov. 6, 1972, Ser. No. 304,043
Int. Cl. C08g 33/10, 51/26
U.S. Cl. 260—30.4 EP         8 Claims

ABSTRACT OF THE DISCLOSURE

High molecular weight epoxy and phenoxy resins are disclosed which possess pendant acetal or ketal groups. Such resins have lower solution viscosities.

---

This invention relates to high molecular weight phenyl ether-containing compounds having pendant acetal or ketal groups.

High molecular weight epoxy and phenoxy resins are useful as solution coatings; however, they require large amounts of solvent to reduce the viscosity to practical values for proper or convenient application to the substrates to be coated.

It has now been discovered that when at least 90% of the pendant aliphatic OH groups are converted to acetal or ketal groups, the solution viscosities are lowered and the resins are rendered soluble in a greater number of solvents.

The epoxy and phenoxy(phenyl ether) resins of the present invention are represented by the formula

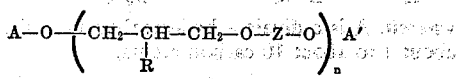

wherein Z is the residue of a dihydric phenol or bisphenol, A and A' are terminal groups, $n$ has a value such that the weight average molecular weight is at least about 2,000, each R is independently OH or an acetal or ketal group and wherein at least about 90% and preferably at least about 95% of the R groups are acetal or ketal groups.

The phenoxy and epoxy resins of the present invention are mixtures of polymers of differing molecular weights, but the molecular weight of each individual molecule is unimportant so long as the average molecular weight is at least about 2,000.

The terminal groups (A and A') of the resins of this invention do not significantly affect the properties of the resultant coatings. The terminal groups can be independently glycidyl groups, saturated or unsaturated aliphatic groups having from about 1 to about 8 carbon atoms, halogen, alkoxy, aromatic hydrocarbon groups either unsubstituted or substituted with such groups as hydroxy, alkyl, alkoxy, chlorine, bromine, ester, and the like; or the terminal groups can be acyl groups having 1 to about 6 carbon atoms, hydrogen and the like.

The resins from which the resins of the present invention are prepared are well known in the art as well as methods for their preparation. The phenoxy resins are described in U.S. Pat. 2,602,275; U.S. Pat. 3,177,090, U.S. Pat. 3,306,872 and Encyclopedia of Chemical Technology, vol. 10, pp. 111–122, Interscience Publishers, 1969.

The epoxy resins which are employed in the present invention can be prepared by known methods such as those described in Handbook of Epoxy Resins by Lee and Neville, chapter 2, particularly pp. 2–6 through 2–9.

The resins which are modified to produce the resins of the present invention have repeating units of the formula

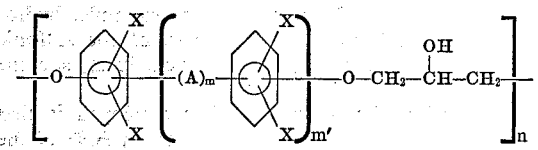

wherein each X is independently hydrogen, chlorine or bromine, A is a divalent hydrocarbon radical having from about 1 to about 10 carbon atoms,

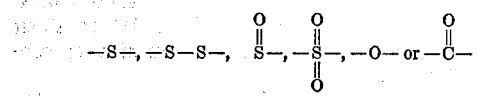

wherein $n$ has a value so as to provide an average molecular weight from about 1,000 to about 200,000, and preferably from about 2,000 to about 100,000, $m$ is 0 or 1, and $m'$ is 0 or 1.

The resins are terminated by either an OH group or a glycidyl ether group

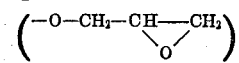

or a mixture thereof.

The resins of the present invention are prepared by reacting the pendant aliphatic hydroxyl groups with an ethylenically unsaturated ether such as those represented by the formula

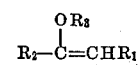

wherein $R_1$ and $R_2$ are independently a hydrocarbon group having from 1 to about 6 carbon atoms or hydrogen or wherein $R_1$ and $R_2$ are collectively the group —$CH_2$—$CH_2$—$CH_2$—$CH_2$— and wherein $R_3$ is a hydrocarbon group having from 1 to about 6 carbon atoms.

Suitable ethylenically unsaturated ethers include, for example, vinyl methyl ether, vinyl ethyl ether, vinyl propyl ether, vinyl cyclohexyl ether, isopropenyl methyl ether, isopropenyl ethyl ether, isopropenyl isopropyl ether, isopropenyl butyl ether, isopropenyl hexyl ether and isopropenyl cyclohexyl ether.

The modified resins of the present invention are prepared by reacting the epoxy or phenoxy resin containing aliphatic hydroxyl groups with the unsaturated ether at temperatures of from about −10° C. to about +90° C. in a suitable solvent in the presence of an acidic catalyst.

Suitable such solvents include any of a wide variety of aprotic solvents such as, for example, the lower molecular weight aldehydes and ketones, the dialkylsulfoxides, the N,N-dialkylformamides and acetamides, the dialkyl ethers and cycloalkyl ethers and polyethers, and various esters, chlorinated alkanes, and nitro, alkyl and aryl compounds, mixtures thereof and the like.

Suitable aldehydes and ketones include, for example, acetone, methyl ethyl ketone, 2-pentanone, 3-pentanone, methyl isobutyl ketone, butyraldehyde, amylaldehyde, isoamylaldehyde, methyl butyl ketone, cyclohexanone, and methyl pentyl ketone, mixtures thereof and the like.

Suitable dialkyl sulfoxides include, for example, dimethyl sulfoxide, diethyl sulfoxide, dipropyl sulfoxide and mixed alkyl sulfoxides, mixtures thereof and the like.

Suitable formamides and acetamides include, for example, N,N-dimethyl formamide, N,N-diethyl formamide, N,N-dimethyl acetamide, N,N-diethyl acetamide, mixtures thereof and the like.

Suitable dialkyl, cycloalkyl and polyethers include, for example, dibutyl ether, diamyl ether, tetrahydrofuran, dioxane, furan, glyme, diglyme, dipropyl ether and diisopropyl ether, mixtures thereof and the like.

Suitable esters, chlorinated alkanes, and nitro compounds include, for example, ethyl acetate, ethyl propionate, methyl acrylate, ethylene glycol monoethyl ether acetate, methylene chloride, ethylene chloride, nitro methane, nitro ethane and nitro benzene, mixtures thereof and the like.

Suitable acidic catalysts include, for example, hydrochloric, sulfuric, boron trifluoride, paratoluene sulfonic acid, and ion exchange resins in the acid form, and the like.

The quantity of unsaturated ether employed is that quantity which will react with at least about 90% of the aliphatic hydroxyl groups contained in the epoxy or phenoxy resin employed up to an excess of about two moles of ether per aliphatic hydroxyl group.

The quantity of catalyst employed is from about 0.05% to about 3.0% and preferably from about .1% to about 1% by weight based upon molar concentration of substituted vinyl ether.

The quantity of solvent employed is twenty to eighty percent by weight based upon the total weight of the reaction mixture.

While the modified epoxy and phenoxy resins of the present invention can be employed as adhesives and molding compounds, they are particularly suitable for use as solution coatings, since their lower solution viscosities result in a substantial reduction in the quantity of solvent which must be recovered or released to the atmosphere, thereby rendering them more suitable from an ecology standpoint than the unmodified epoxy or phenoxy resins.

Furthermore, the properties of the coatings resulting from the modified epoxy or phenoxy resins of the present invention are not significantly reduced as a result of the modification.

In the preparation of coatings, the resins of the present invention may be employed as a solution with or without other components such as pigments, dyes, fillers, dispersing agents, surfactants, and the like.

The following examples are descriptive of the present invention, but are not to be construed as limiting the scope thereof in any manner.

EXAMPLE 1

To a reaction flask equipped with a stirrer, condenser, addition funnel and thermometer was added 18.92 g. of methyl isopropenyl ether and one drop of concentrated (37%) hydrochloric acid. The temperature of the reaction was controlled below 40° C. and 200 grams of a 40% solution of a bisphenol A based resin in methyl ethyl ketone, the resin having repeating units represented by the formula

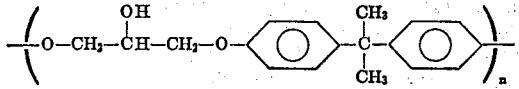

wherein $n$ is such that the weight average molecular weight was about 50,000, said resin solution, being commercially available from The Dow Chemical Company as D.E.R.® 684, was added with vigorous stirring. The reaction was followed by infrared spectrophotometry until about 99% of the hydroxyl groups were capped. The viscosity of the capped and uncapped material both at 40% solids in methyl ethyl ketone was determined with the following results:

|  | Stokes |
|---|---|
| Viscosity before capping | 17.6 |
| Viscosity after capping | 0.065 |

Upon addition of 31% acetone, the uncapped resin fell out of solution; the capped resin solution was soluble in all proportions with acetone. As a 45% solution with toluene, the uncapped resin solution was insoluble; the capped solution was infinitely soluble in toluene. As a 37% solution with xylene, the uncapped resin solution was insoluble; the capped resin solution was infinitely soluble in xylene. Both the capped and uncapped resins when applied to standard panels and the solvent baked out (300° C. for 30 minutes) were tested and passed the forward and reverse 190 in.-lb. ball drop impact test. Both test panels were boiled in water for 30 minutes without effect and both panels showed the same results in the pencil hardness test.

EXAMPLE 2

To a reaction flask equipped with a stirrer, condenser, addition funnel and thermometer was added 500 g. D.E.R.® 684, 40% in methyl ethyl ketone, and 100 g. of ethyl vinyl ether. The mixture was stirred vigorously and 4 drops of concentrated HCl was added to the flask. The temperature was controlled below 30° C. The mixture was stirred for 48 hours until infrared spectrophotometry indicated over 95% capping of the hydroxyl groups. Excess flake caustic soda was added to neutralize the acid and the liquid was decanted off. The capped and uncapped resins were adjusted to 37% solids in methyl ethyl ketone and the viscosity was determined with the following results.

|  | Stokes |
|---|---|
| Viscosity before capping | 23 |
| Viscosity after capping | 10.2 |

As a 45% solution in toluene the initial, uncapped resin solution was insoluble; the capped resin solution was infinitely soluble in toluene.

We claim:

1. Resin compositions having repeating units represented by the formula

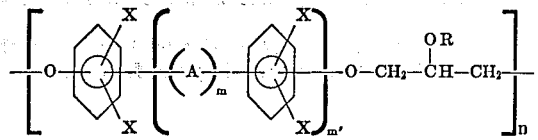

wherein A is a divalent hydrocarbon radical having from about 1 to about 10 carbon atoms,

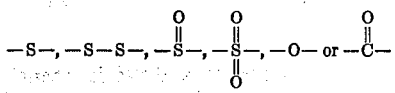

each X is independently hydrogen, chlorine or bromine, $n$ has a value so as to provide an average molecular weight of from about 1,000 to about 200,000, $m$ has a value of zero or 1, $m'$ has a value of zero or 1 and at least 90% of the R groups being selected from a group represented by the formula

wherein $R_1$ and $R_2$ are independently a hydrogen atom or a hydrocarbon group having from 1 to about 6 carbon atoms or wherein $R_1$ and $R_2$ are collectively the group —$CH_2$—$CH_2$—$CH_2$—$CH_2$—, and wherein $R_3$ is a hydrocarbon group having from 1 to about 6 carbon atoms and the remainder of the R groups being hydrogen.

2. Resin compositions of claim 1 wherein $m$ and $m'$ each have values of 1.

3. Resin compositions of claim 2 wherein A is an isopropylidine group.

4. Resin compositions of claim 2 wherein $n$ has a value such that the average molecular weight of the resin is from about 2,000 to about 100,000.

5. A process for reducing the solution viscosities of resins having repeating units represented by the formula

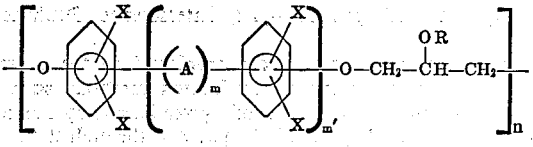

wherein A, X, $m$, $m'$ and $n$ are as defined in claim 1 which comprises reacting the aliphatic hydroxyl groups of the resin with an ethylenically unsaturated ether or mixture of such ethers in the presence of a catalytic quantity of an acid catalyst at a temperature of from about $-10°$ to about $90°$ C. and wherein the quantity of vinyl ether is sufficient to convert at least 90° of the aliphatic hydroxyl groups of the resin to the corresponding acetal or ketal and wherein said vinyl ethers are those represented by the formula

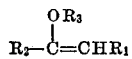

wherein $R_1$ and $R_2$ are independently a hydrogen atom or a hydrocarbon group having from 1 to about 6 carbon atoms or wherein $R_1$ and $R_2$ are collectively the group $-CH_2-CH_2-CH_2-CH_2-$, and wherein $R_3$ is a hydrocarbon group having from 1 to about 6 carbon atoms and the remainder of the R groups being hydrogen.

6. A solution coating composition comprising a resin of claim 1 and a solvent or solvent mixture wherein the resin component comprises from about 20 to about 80% by weight of the coating composition.

7. Resin compositions of claim 3 wherein $R_1$ is hydrogen and $R_2$ and $R_3$ are methyl groups.

8. Resin compositions of claim 4 wherein $R_1$ is hydrogen and $R_2$ and $R_3$ are methyl groups.

References Cited
UNITED STATES PATENTS
3,530,096  9/1970  Dobinson et al. ____260—47 EP LEWIS T. JACOBS, Primary Examiner U.S. Cl. X.R.

260—30.8 R, 31.2 R, 31.6, 32.4, 32.6 R, 32.8 EP, 33.2 EP, 33.8 EP, 47 EP

PO-1050
(5/69)

UNITED STATES PATENT OFFICE
CERTIFICATE OF CORRECTION

Patent No. 3,804,795            Dated April 16, 1974

Inventor(s) William O. Perry; Marius W. Sorenson; Thomas J. Hairston

It is certified that error appears in the above-identified patent and that said Letters Patent are hereby corrected as shown below:

In the formula at Col. 4, lines 70-75, change "OR" to read --OH--.

In Col. 5, lines 6 and 9, delete "vinyl" and insert therefor --ethylenically unsaturated--.

Signed and sealed this 22nd day of October 1974.

(SEAL)
Attest:

McCOY M. GIBSON JR.
Attesting Officer

C. MARSHALL DANN
Commissioner of Patents